United States Patent
Nisser

(10) Patent No.: US 12,468,392 B2
(45) Date of Patent: Nov. 11, 2025

(54) COMPUTER-IMPLEMENTED METHOD AND APPARATUS FOR DETERMINING REACTION TIME PROCESSES

(71) Applicant: SANIVA DIAGNOSTICS GMBH, Erfurt (DE)

(72) Inventor: Jenny Nisser, Erfurt (DE)

(73) Assignee: Saniva Diagnostics GMBH, Erfurt (DE)

( * ) Notice: Subject to any disclaimer, the term of this patent is extended or adjusted under 35 U.S.C. 154(b) by 0 days.

(21) Appl. No.: 18/259,536

(22) PCT Filed: Dec. 22, 2021

(86) PCT No.: PCT/EP2021/087330
§ 371 (c)(1),
(2) Date: Jun. 27, 2023

(87) PCT Pub. No.: WO2022/144277
PCT Pub. Date: Jul. 7, 2022

(65) Prior Publication Data
US 2024/0061512 A1     Feb. 22, 2024

(30) Foreign Application Priority Data
Dec. 29, 2020   (DE) .................... 10 2020 135 038.4

(51) Int. Cl.
G06F 3/01    (2006.01)
G02B 27/01    (2006.01)
G06F 3/0346    (2013.01)

(52) U.S. Cl.
CPC ............. *G06F 3/017* (2013.01); *G02B 27/01* (2013.01); *G06F 3/011* (2013.01); *G06F 3/014* (2013.01); *G06F 3/0346* (2013.01)

(58) Field of Classification Search
None
See application file for complete search history.

(56) References Cited

U.S. PATENT DOCUMENTS

| | | | |
|---|---|---|---|
| 6,092,867 A * | 7/2000 | Miller | A63F 13/98 297/250.1 |
| 10,675,766 B1 | 6/2020 | Niemeyer et al. | |

(Continued)

FOREIGN PATENT DOCUMENTS

| | | |
|---|---|---|
| EP | 2997887 A1 | 3/2016 |
| EP | 3621084 A1 | 3/2020 |
| JP | 2011110215 A | 6/2011 |

OTHER PUBLICATIONS

International Search Report and Written Opinion of International Application No. PCT/EP2021/087330, mailed on Apr. 21, 2022, Full translation.

(Continued)

*Primary Examiner* — Parul H Gupta
(74) *Attorney, Agent, or Firm* — Heslin Rothenberg Farley & Mesiti P.C.

(57) ABSTRACT

The invention relates to a computer-implemented method for determining reaction time processes, more particularly detection of sensory motor skills and stimuli processing in the reaction to one or various stimuli, of at least one user by means of at least one sensor system or sensor array. The movement of a hand of the user is detected by the sensors of a device shortly before, during and after catching the virtual object. The reaction times of the user are detected by sensors while virtual surroundings are shown to the real user.

16 Claims, 5 Drawing Sheets

(56) References Cited

U.S. PATENT DOCUMENTS

Figure 1:
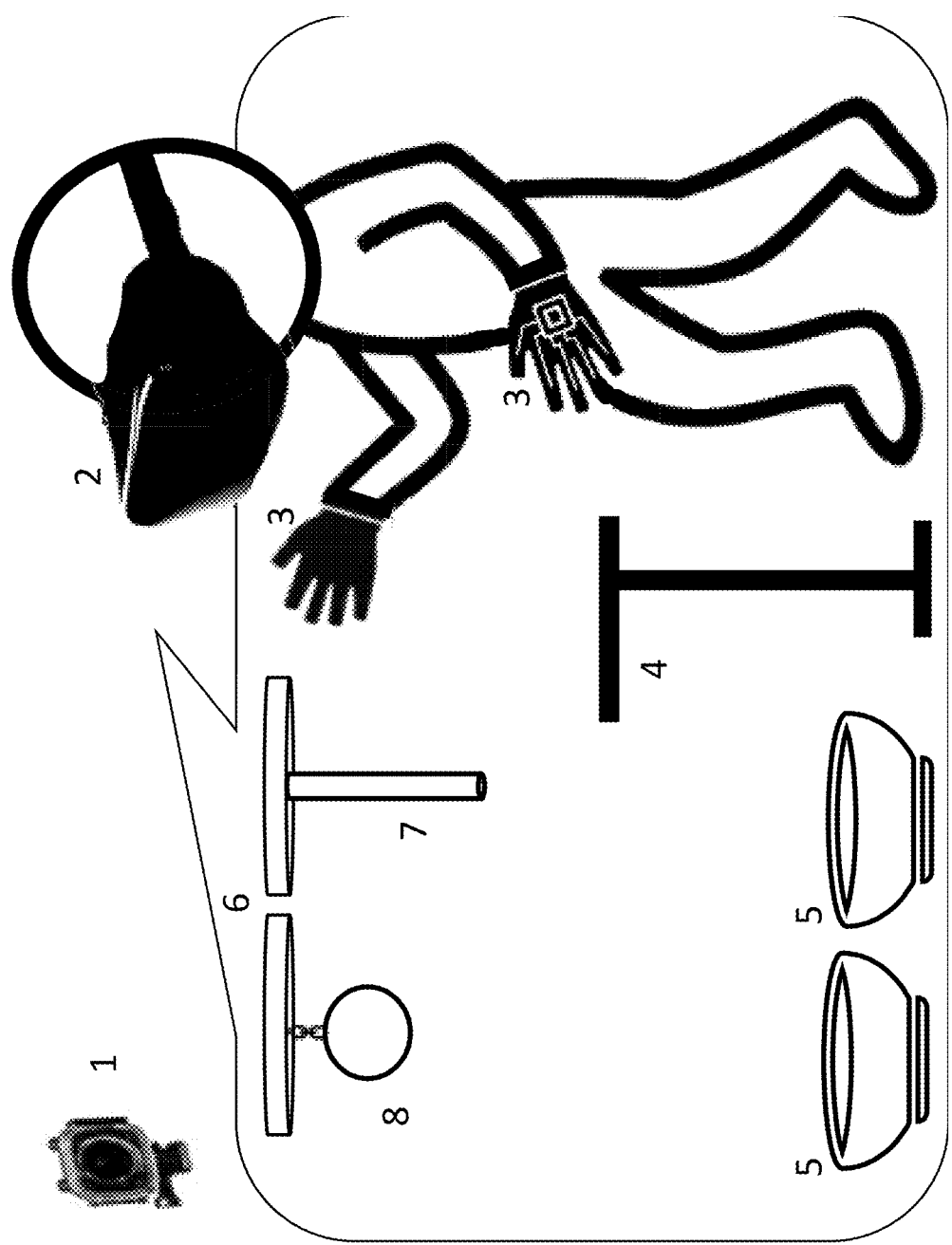

| | | | |
|---|---|---|---|
| 2010/0324443 A1* | 12/2010 | Ashton-Miller | A61B 5/1125 |
| | | | 600/554 |
| 2014/0371633 A1 | 12/2014 | Evin et al. | |
| 2016/0054798 A1* | 2/2016 | Messingher | G06F 3/014 |
| | | | 345/156 |
| 2017/0169379 A1* | 6/2017 | Horseman | G06Q 10/00 |
| 2020/0129106 A1 | 4/2020 | Arbel et al. | |

OTHER PUBLICATIONS

Bandow et al., "Development and evaluation of a virtual test environment for performing reaction tasks," International Journal of Computer Science in Sport, Jan. 1, 2012, vol. 11(2): pp. 4-15.

Galvan-Ruiz et al., "Perspective and Evolution of Gesture Recognition for Sign Language: A Review," Sensors, Jun. 24, 2020, vol. 20(12): pp. 3571.

Ohashi et al., "Comparison of Electromyogram During Ball Catching Task in Haptic VR and Real Environment," Advances in Biometrics: International Conference, ICB 2007, Seoul, Korea, Aug. 27-29, 20071 Proceedings: [Lecture Notes in Computer Science; Lect. Notes Computer, Springer, Jun. 7, 2018, pp. 415-425.

Kuling et al., "Grip force preparation for collisions," Experimental Brain Research, 2019, vol. 237: pp. 2585-2594.

* cited by examiner

COMPUTER-IMPLEMENTED METHOD AND APPARATUS FOR DETERMINING REACTION TIME PROCESSES

CROSS REFERENCE TO RELATED APPLICATIONS

This application is a national stage filing under section 371 of International Application No. PCT/EP2021/087330, filed on Dec. 22, 2021, and published on Jul. 7, 2022 as WO 2022/144277, which claims priority to German Application No. 10 2020 135 038.4, filed on Dec. 29, 2020. The entire contents of WO 2022/144277 are hereby incorporated by reference herein.

The invention relates to a computer-implemented method for detecting motor reaction tasks, such as one-handed catching of a suddenly falling measurement body.

The motor function can be quantified by a series of motor tests.

Motor tasks with increased complexity, in the sense of a linking of various skills and requirements, by contrast indicate motor limitations at an early stage. Among these is the one-handed catching of a suddenly falling rod, as is tested in what is known as the ruler drop test. What is hereby tested is the capability of reacting to an isolated, subtle optical signal and the requirement for fast stimulus processing, wherein hand-eye coordination and specific attentional direction represent the limiting factors in typical everyday movement.

The subject matter of US 2020 0129106A1 is a system based upon virtual or augmented reality for evaluating and measuring reaction time. In various embodiments, the system, the methods, and the computer program products relate to the assessment and measurement of the reaction time of a patient or a user in a virtual reality (VR) or augmented reality (AR) environment. The VR/AR system may provide a sensory stimulus to the patient/user in the VR/AR environment, determine a plurality of movement parameters, and determine a response time on the basis of the plurality of movement parameters by applying a time window selection model.

EP 3 621 084 A1 describes a method for generating a virtual reality environment for exercises for a user via a wearable display. The method is characterized by the following steps:
  selecting an operating mode of the exercise;
  displaying, on the wearable display, a virtual reality environment corresponding to the selected operating mode, while the user executes the necessary steps of exercise in the virtual reality environment corresponding to the selected operating mode,
  recording parameterized results of the exercise, wherein the parameters are measured as at least one of the following criteria: time, distance, speed, accuracy;
  obtaining user feedback with respect to the exercise unit;
  analysis of the recorded results of the exercise, and
  providing a suggestion for a next exercise based upon the analytical result and the feedback of the user.

EP 2 997 887 A1 discloses a virtual 3-D environment of the main parts of a traditional CAVE space. The virtual 3-D environment has projection means for projecting images of the object to be tested onto the surface of at least one display element of the virtual 3-D environment. The virtual 3-D environment further comprises at least one computer for generating images in the virtual environment and for recording brain function by means of electroencephalography (EEG). The EEG signals which are generated during the observation of the object by the observer are of interest. A brain response generated by the observed object is processed from the recorded EEG data with neuroanalytical methods, wherein the emotional and/or cognitive state experienced by the observer at the point in time of the test is apparent from the brain response. A direct correlation of stimulus and neurological response can be realized with this system.

However, there is the problem that the solutions of the prior art have a game-like character, and do not check the everyday functions or sensory motor capabilities in the sense of a detection of motor parameters. The underlying basic motor capabilities are thus not measurable in a standardized manner, and an early detection of conspicuities in motor capabilities and stimulus processing is not possible.

It is an object of the invention to overcome the obvious disadvantages of the prior art, and to enable the virtual application of a motor test which serves to enable the detection of the sensory motor performance in a reaction task.

The object is achieved via the features of the independent claims. Preferred embodiments are the subject matter of the dependent claims in each case.

Given a complex neurocognitive task such as, for example, the one-handed catching of the suddenly falling virtual object, motor and kinematic measurement data are recorded and evaluated—in particular, as time processes. The virtual motor test, e.g., as a virtual ruler drop test, is thereby implemented purely in software, in part with manually-operable supporting hardware sensor systems. The movement of the hand in particular can thus be detected during one-handed catching. For example, a suddenly falling object appears in a virtual reality (VR) environment, which object must be caught by the user from a defined stance. The movement profiles and sequences of at least one sensor system are detected during the testing situation, which has the catching of the object as a central theme. By means of a computer-implemented method, the testing environment is generated, and all relevant data are determined for evaluation and/or classification.

For this purpose, a computer-implemented method for determining reaction time processes of at least one user by means of at least one sensor system or a sensor array has the following steps:
  i. presenting at least one virtual object in a virtual space,
  ii. displaying a directed movement of the virtual object in a space, wherein the movement proceeds along an axis which corresponds to the x-, y-, or z-axis of a Cartesian coordinate system, in relation to the user,
  iii. determining or calculating the real reaction time process of the directed movement of the virtual object,
  iv. detecting the user in real space,
  v. detecting the movement or movement sequences of the user in real space,
  vi. determining or calculating the real reaction time process of the directed movement of the user,
  vii. correlating the virtual and real movement sequences of steps iv and vi, and
  viii. determining the reaction time processes using the movement sequences from steps iv and vi.

According to the invention, the computer-implemented method for determining reaction time processes acts as a surrogate for interaction with an object in a virtual environment.

In embodiments, the computer-implemented method for determining reaction time processes acts as a surrogate for the one-handed catching of an object such as, for instance, a rod in a virtual environment.

The method according to the invention advantageously determines the reaction time of the user for interacting with a moving object, such as, for instance, catching a falling object. The user is thereby presented with a virtual object which moves along an axis—the x-, y-, or z-axis of a Cartesian coordinate system. The movement of the user in real space for interacting with the virtual object is detected and correlated with the virtual movement sequence of the object. By determining the collision point, the reaction time of the user up to the interaction with the object can be determined.

According to the invention, the user thereby serves as a reference point for the Cartesian coordinate system. As a rule, the axis for falling objects thereby runs along the y-axis of the Cartesian coordinate system, in the direction of gravity. The z-axis accordingly runs in the forward or backward direction of the user; the x-axis runs laterally to the left and right of the user.

The movement of a respective hand of the user is detected by sensors of an apparatus shortly before, during, and after the interaction of the virtual object.

A sensor apparatus for determining reaction time processes of a real user in a virtual environment thereby comprises:
 at least one data processing unit,
 at least one display element that is suitable for presenting virtual objects in a virtual space,
 at least one output device that is suitable for outputting or relaying the determined sensory information.

In embodiments of the invention, the sensor apparatus comprises at least one interface to a database suitable for storing and comparing the determined sensory data, and at least one sensor system.

In the following, the reaction time process is understood to mean that motor movement which is executed after receiving an initial key stimulus—for example, the detection of a signal such as, for instance, a falling object—up to the completed reaction—for example, the secure catching of the object. The reaction time process allows conclusions to be drawn about the reaction time of a user via a start point and a stop point in time. In addition to start and stop points in time, instantaneous values of the movement are also collected, such as, for example, acceleration or velocity of individual extremities of the user while they perform the directed movement which is necessary for catching the falling object, for example.

In the following, a user is understood to be a test subject who is subjected to the actual measurement for determining the reaction time processes. Via the interaction with the apparatus according to the invention, or from the application of the method according to the invention, the user supplies data which make their reaction capability classifiable and, if applicable, allow a conclusion of irregularities—for example, in the event of neurological and/or neurodegenerative illnesses.

In embodiments of the invention, the computer-implemented method is characterized in that at least one starting point and at least one collision point of at least one virtual object and the user is determined from the reaction time process of the directional movement of the virtual object and the reaction time process of the movement of said at least one user.

This is advantageous, since, by specifying a collision point, a verifiable criterion is created in order to specify the conclusion of a motor reaction to an initial key stimulus. The collision point is the point in time at which an interaction of a virtual object with a real user would take place. If, for example, a falling object is presented in a virtual environment, and a real user is observed in the attempt to catch this, the collision point would be reached as soon as the hands of the user touch the falling object for the first time.

In embodiments of the invention, the reaction time of the user is determined from a start signal and the determined collision point. This is advantageous, since the core information—the reaction time—is determined with a lower degree of measurement uncertainty than is so for a conventional drop test or in the solutions mentioned in the prior art, since these completely dispense with the determination of a collision point.

In embodiments of the invention, the directed movement takes place along an axis which is designed as a y-axis of a Cartesian coordinate system. The object is thereby moved along the axis in the virtual environment. The movement of the object can thereby be designed as a falling movement from top to bottom, or as an ascending movement from bottom to top. The user can thereby interact with the object in the virtual environment such that they catch the object during the downward or upward movement. A successive execution of both types of movement is also conceivable. In embodiments of the invention, it can be provided that two objects be presented in the virtual environment, wherein the objects execute an opposite movement. The objects can thereby move towards one another or away from one another. Different items of information can thereby be gathered after interaction has taken place in the different types of movement, which items of information in combination allow an improved informational value with regard to the user's reaction capability.

In embodiments of the invention, the directed movement takes place along an axis which is designed as an x-axis of a Cartesian coordinate system. The movement of the object in the virtual environment can thereby be designed such that the object moves from one side to the other side. For example, the object can move from the left edge of the user's field of view to the right edge, or from the right edge of the user's field of view to the left edge. It is also conceivable that the object move from a middle position in the field of view of the user to a left or right side.

In embodiments of the invention, a presentation of two objects in the virtual environment takes place, wherein the two objects execute an opposite movement. The reaction time process of the user in the interaction with both objects is thereby determined, and thus the complexity of the task is increased. Additional information regarding the reaction capability of the user can thereby be obtained.

In embodiments of the invention, the directed movement takes place along an axis which is designed as a z-axis of a Cartesian coordinate system. A directed movement of the object in the virtual environment thereby took place such that the object moves from the background towards the user. It is also conceivable that the object move away from the user, into the background. During this movement of the object, the user must decide at which point in time they wish to interact with the object, depending upon the reach of the user for the interaction with the object.

In embodiments, a presentation of two objects in the virtual environment takes place, wherein the two objects execute an opposite movement. One object thereby moves away from the user, towards the background, while a second object moves from the background towards the user. The reaction time process of the user in the interaction with both objects is thereby determined, and thus the complexity of the task is increased. Additional information regarding the reaction capability of the user can thereby be obtained.

Alternatively, the method is designed as a variable reaction test with neurocognitive task. The user thereby has the opportunity to decide upon a type of reaction to the object in the virtual environment. The user can thereby decide whether they would like to interact with the object or actively avoid the object. The task thereby comprises the execution of different movements in response to different signals. In this case, the signals can vary as to the movement of the object (y-axis from top to bottom and from bottom to top, x-axis from right to left and left to right) and type of appearance of the object (popping-up, fading, and vibrating/jittering). The required movements can include one-handed catching movement with the right or left hand, two-handed catching, no movement, active evasion with an open hand, pronation and supination of the hand from the neutral position, catching with first closure, catching in pincer grip, catching on one finger (e.g., finger pad of the index finger).

In embodiments of the invention, at least one sensor system is designed for contact-free or contactless detection of measurement data. For example, but not limited thereto, the contactless detection is realized by an ultrasonic echo sounding system. The area in which a user stands is thereby flooded with ultrasonic waves. The presence of the user interferes with the ultrasonic field, so that a contactless detection is enabled. Furthermore, the movement sequences can thus be detected in a contactless manner, and the reaction time processes can thus be recorded via the ultrasound scattering.

In embodiments of the invention, the at least one optical sensor system which is suitable for detecting movement sequences. For example, but not limited thereto, the optical detection to detect via an optical camera system. The user is thereby at least partially captured by at least one camera, and preferably by more than one camera, wherein the extremities of the user belong at least to the optically detected part of the respective user. If the moment of "gripping" is now recorded by optical camera, at least the reaction time can be determined in conjunction with a synchronized test profile. A synchronized test profile is hereby understood to mean a correlation between the start of the test sequence and the simultaneous start of the monitoring of the user.

Advantageously, the monitoring of the user is thereby preferably implemented in the form of a digitized video recording. The movement profiles are thus directly accessible to a data processing system.

In embodiments of the invention, the at least one sensor system is suitable for gathering measurement data by detecting contact by the user. This is advantageous, since the collision point can be detected by sensory devices in this way. For example, but not exclusively, the shutter of a camera system is coupled to a touch-sensitive switch. This switch is arranged on a rod-shaped object which corresponds in size and appearance to the object virtually presented to the user. By touching the object during the virtual test protocol—preferably at the moment of catching—an optical camera system is started, or the recording rate of a camera system in operation is increased, in order to thus obtain a higher-detail recording of the user's motor processes. This is, furthermore, advantageous, since thus only the essential data of the movement process are detected.

In embodiments of the invention, the sensor system for detecting the movement data is arranged in or on an additional real measuring device. In embodiments of the invention, the sensor system furthermore comprises sensors for determining the position in three-dimensional space. The position of the user in three-dimensional space can thereby be determined by means of the sensors and be presented in real time in the virtual environment. A real representation of the interaction of the user with the virtual object in the virtual environment can thereby be ensured, which is of considerable importance in particular in the determination of the reaction time.

In embodiments, the sensor system is fixed, for example, to the hand by means of a glove or an arm of the user by means of hook-and-loop bindings. By means of an output unit, e.g., VR goggles, the test environment of a virtual ruler drop test is displayed to the user. The sensor system hereby comprises, for example, an acceleration sensor—without being limited thereto—which is formed by coupling to a data processing unit for recording time-dependent instantaneous values of the acceleration. Instrumental to this is a kind of glove which is itself equipped with sensors or individual sensors which are attached directly to the hand—preferably acceleration sensors and sensors for determining position in three-dimensional space. This is advantageous, since the acceleration is thus made accessible to a direct measurement.

In embodiments, the sensor system designed as a glove furthermore comprises vibrotactile elements or force-feedback systems which provide haptic feedback to the user when the virtual object is caught. This is advantageous in order to convey to the user when they have caught the virtual object, in order to avoid oversteering the grip.

In embodiments of the invention, the measuring device for sensory detection or the enclosure of the sensory device for measuring the parameters of the movement sequences is based, in terms of its shape, upon the virtually presented object in its presented shape. This is advantageous, since the illusion of a real measurement standard of the test environment is thus produced for the user. This ensures a subconscious acceptance of the measurement setup—it brings about the creation of what is known as a percept—and thus offers fewer systematic errors due to subconscious responses, such as hesitations.

In embodiments, the measuring device is oriented vertically and has the form of a rod. The measuring device is preferably arranged in such a way that the user can reliably grasp this during the method according to the invention for measuring the reaction time process. For this purpose, the positioning of the measuring device is presented to the user in the virtual space as a virtual object.

In embodiments of the invention, the measuring device furthermore comprises a positioning device which allows a free positioning in space. Corresponding positioning devices are, for example, a robot arm, delta robot, multi-axis system, or hexapod, or combinations thereof.

Via a collision point prediction or determination, it is ensured that, via corresponding positioning of the measuring device, the user touches the virtual object exactly at the visually correct moment, and the correct tactile surface properties around the collision point are displayed; user and virtual object are thus synchronized with one another. The user thus has a complete percept; they see and feel the virtual object that, to them, is objectified and actually exists, but in reality touch the correspondingly positioned measuring device.

In embodiments, the measuring device is designed in such a way that the sensors are integrated into a planar structure, and the planar structure is designed so that it can subsequently be arranged detachably on a rod-shaped object.

In embodiments of the invention, the planar structure comprises pressure sensors. It is thereby advantageously possible to gather information regarding the grip strength of the user, in addition to the actual determination of the reaction time process. The isometric hand strength, but also the hand strength in a dynamic movement task, can thereby be determined and be compared with age-appropriate standard values of the user, which can provide indications of possible clinical implications. In combination with the results of the reaction time process, important early findings regarding the status of the user can thus be gathered (LaStayo, P., & Hartzel, J. (1999); Chang, H., et al. (2015)).

In embodiments of the invention, the planar structure is designed in the form of a film or as a textile structure. Furthermore, it has means for releasable arrangement on a rod-shaped object. For example, these means may be, without being limited to, fillets, straps, hook-and-loop fasteners, or the like. A simple, detachable arrangement on a rod-shaped object is thereby possible.

In embodiments of the invention, the sensor system additionally comprises EMG (electromyography) sensors which are designed to directly measure the muscle activity in the lower arm during the reaction performance. The measurement data can be transmitted wirelessly or by wire. In embodiments of the invention, the EMG sensors may function wirelessly or be connected to the dummy via cables.

In order to realize the invention, it is also expedient to combine the above-described embodiments and the features of the claims.

The subject matter of the invention is described in more detail in the following by non-limiting figures and exemplary embodiments.

FIG. 1 schematically shows a possible arrangement of sensors and test subjects for the exemplary embodiment of the computer-implemented method designated as "Variant 1."

Figure 2:
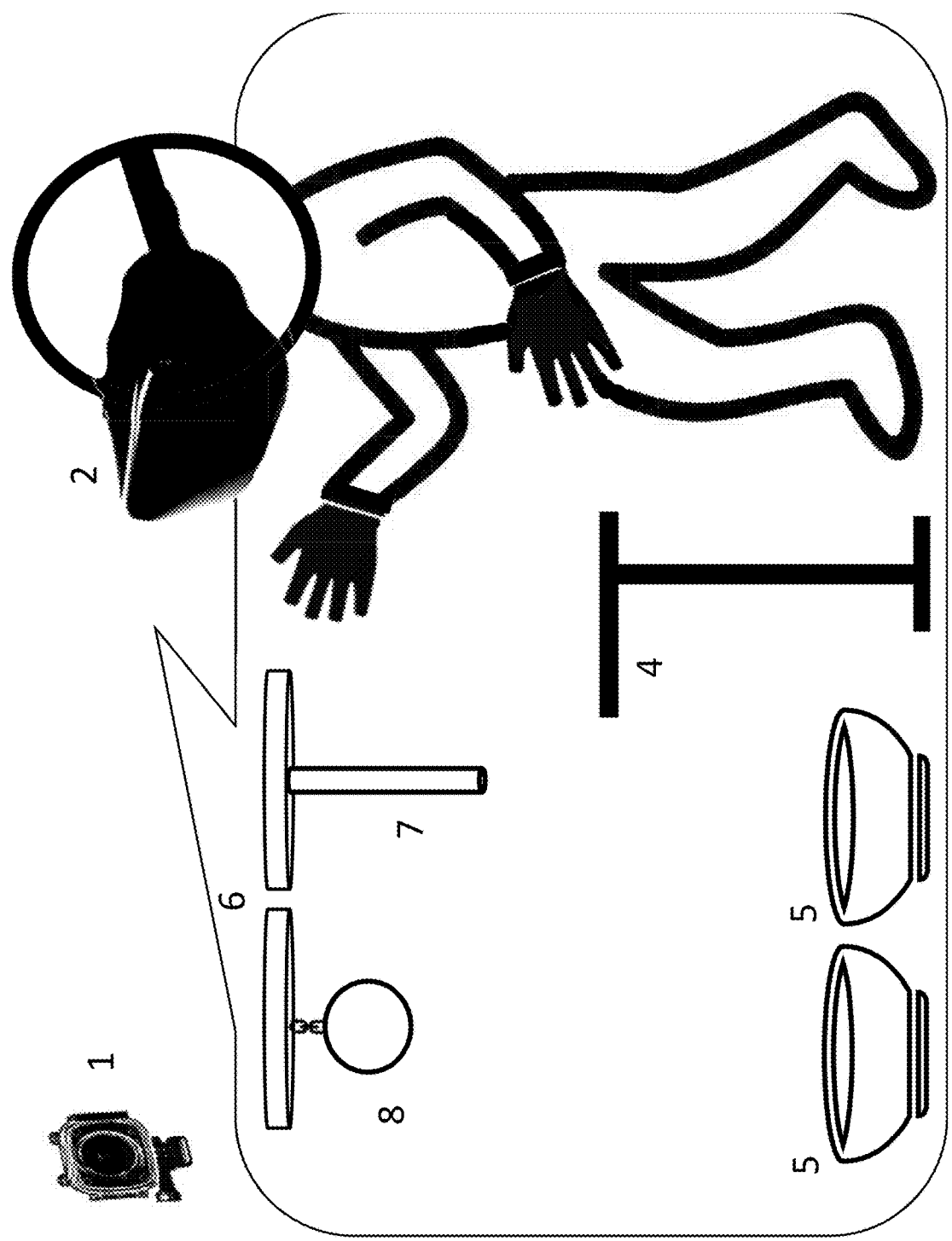

FIG. 2 schematically visualizes, as an exemplary embodiment, a possible arrangement of a test environment for determining the reaction time processes. This is subsequently described in more detail as "Variant 2."

Figure 3:
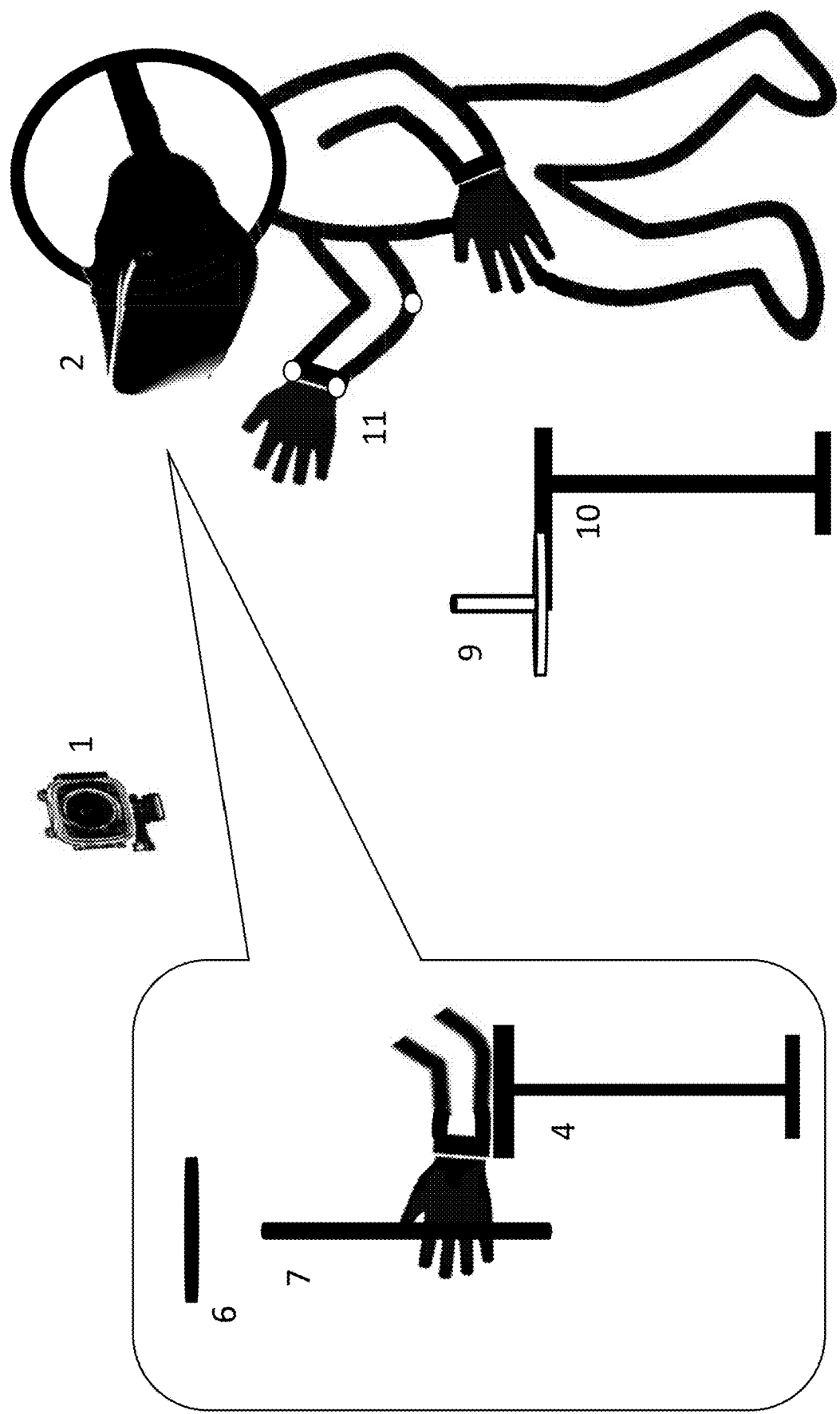
Figure 4:
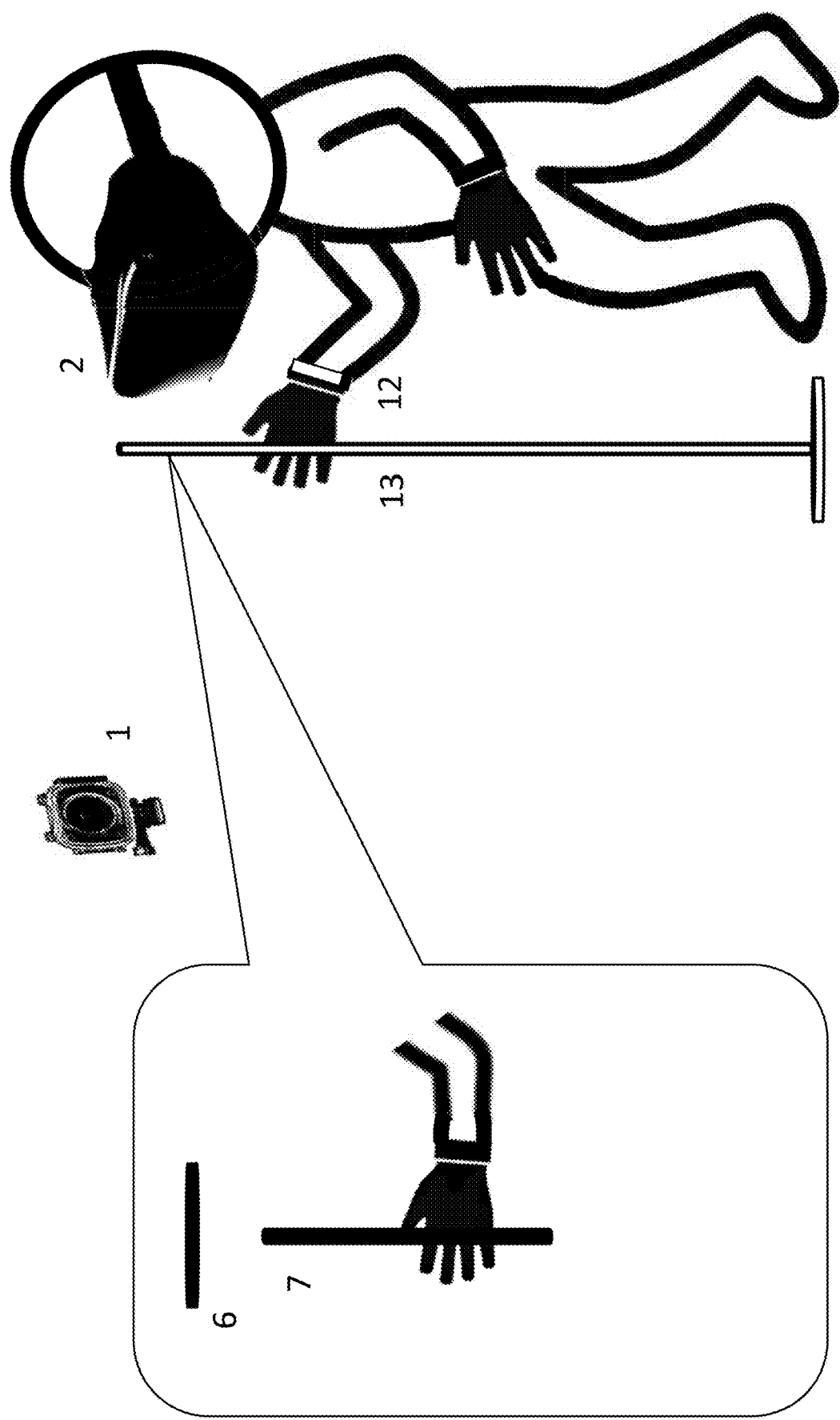

Diagrammatically and schematically presented in FIG. 3 and FIG. 4 is a further possible arrangement for implementing a test for determining the reaction time processes. This is subsequently described in more detail as "Variant 3." The shape of the measurement body used in FIG. 3 is thereby a kind of joystick, and in FIG. 4 a kind of slalom pole.

Figure 5:
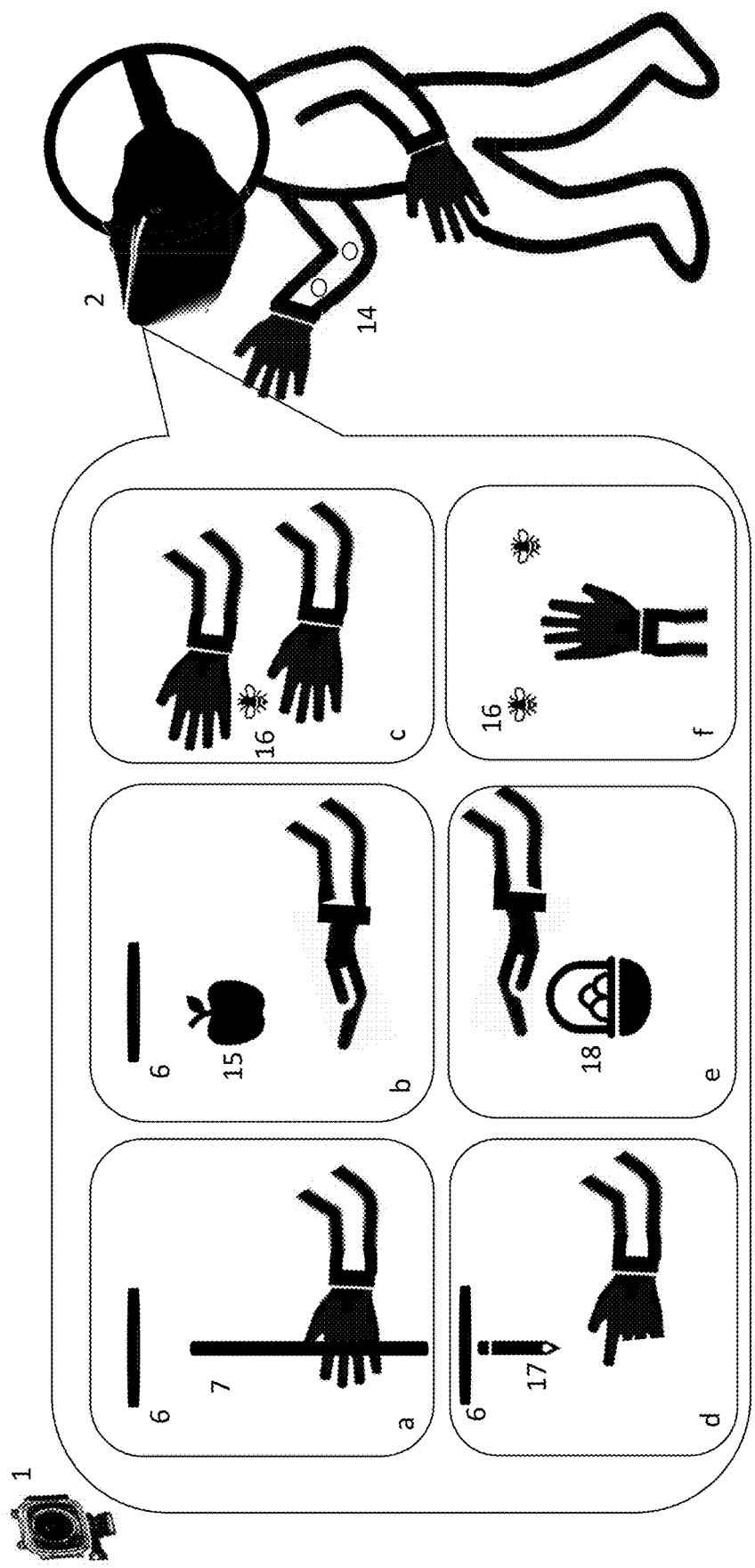

Schematically depicted in FIG. 5, as an exemplary embodiment, is a possible arrangement of a test environment for determining the reaction time processes. This is subsequently described in more detail as "Variant 4."

A first exemplary embodiment is designated in the following as "Variant 1." Variant 1 comprises the application of a test for determining the reaction time processes, wherein the motor reaction capability is detected in a complex neurocognitive task. The test environment required for the test comprises a sensor system suitable for determining motor as well as kinematic measurement data. In this exemplary embodiment, this neurocognitive task is the one-handed catching of a suddenly falling object. The entire test is realized in a substantially software-based manner. The suddenly falling object thereby appears in a virtual reality (VR) application. The movement of the hand in the catching itself, and shortly before and thereafter, is quantified by acceleration sensors on the hand and/or on the arm of the test subject.

The measurement setup comprises a camera, VR goggles, a glove, and, optionally, a bracelet. The camera detects the position and movement of the hand in real space. The real image of the hand is integrated into the VR application, i.e., into the virtual space, and is presented to the user. The glove is used in order to quantify the movement of the hand during the reaction task. The glove is itself equipped with further sensors. In detail, these are hereby acceleration sensors and pressure sensors which detect their respective measured variables in three, preferably orthogonal, spatial directions, as well as in time. Another element for detecting the movement and the acceleration behavior of the upper extremity in three-dimensional space is the bracelet, which has the dimensions of a conventional wristwatch.

The camera is a 360° camera which is suitable for action recordings and has a Wi-Fi interface. Specifically, the "Denver ACV-8305W 360° " model is used. This camera can be controlled with any WLAN-capable terminal.

As VR goggles, the "Oculus Quest" product is used. Oculus Quest are wireless VR goggles that can be used without a PC. They are suitable for use by eyeglass wearers, and the lenses can be adapted according to interpupillary distance. The latter is very relevant for use by a variety of different people.

The glove consists of a woven upper material, and sensors (e.g., acceleration measurement and grip strength measurement) are integrated into this. Sensor surfaces are attached to each finger and to the palm.

Acceleration sensors and a Wi-Fi communications unit are likewise integrated into the wristband that is used. This enables wireless transmission of the gathered parameters to the evaluation unit during the movement measurement.

The software is a VR application that can be accessed on any WLAN-capable terminal via a website. The program controls the VR application, and the examination program is started.

The complete procedure for measuring the reaction capability of a test subject is executed as follows:

1) Optical assistance in assuming the starting position: For this purpose, an object in the form of a table is used, whereby the assumption of a standardized starting position of 90-100° at the elbow joint with respect to the arm posture is to be assumed by the user.
2) Monitoring of the starting position: Before the start of every single test, the starting position is monitored.
3) Simulation of a stationary object: In the upper part of the virtual image, a stationary object is visualized, i.e., in a kind of suspended position.
4) Output of an orientation signal (acoustic or subtly visual): A signal which should serve exclusively for the orientation of the user is output immediately before the beginning of a randomly selected time window. The signal indicates the beginning of the test, but it is expressly not linked to the actual sudden drop of the object. The visual attention of the user should be drawn to the object by the signal. The signal can be output acoustically by a beep tone or subtly visually, i.e., not by a light signal, but rather in that the visualized object wobbles somewhat, for example.
5) Simulation of a vertically falling object: Within the randomly selected time window of 6 seconds after the orientation signal, the virtual image of the object is simulated such that it suddenly falls vertically to the ground. The user perceives the sudden falling of the object only visually. This moment is not supported by an additional signal. Within the time window, the user has the task of catching the simulated object as quickly as possible. The kinematic parameters are detected by the glove, based upon sensors.
6) Simulation of the catching movement and braking of the falling movement of the object: The hand of the user and their movement are visualized in real time in the image. The corresponding movement of the object—in particular, the catching movement and the braking of the object—is simulated. The user thus receives an impression of the catching movement, which, optimally, strongly resembles reality.
7) Evaluation of the test results: The gathered parameters, whereby the movement is quantified, are thereupon collected, and stored in a cloud. Finally, an evaluation of the absolute measurement results takes place with consideration of a standard database of comparative measurements of healthy persons of different ages, and of age-specific limit values. The results are presented on the output page.
8) Input page: In order to be able to evaluate the test results in relation to the standard database, certain reference variables of the user are detected. These can be input in an input protocol (input page). The input can take place via two ways/modes:
a) Input takes place via the terminal (external control), or
b) Input takes place via the VR application (auto-control).
9) Output page: The measured results from each repetition are detected and output on the terminal, and, in reduced form, in the user's field of vision. In addition, there are possibilities for controlling the application/test:
a) The test is started and stored by the terminal (external control);
b) The test can be started by the user itself and stored via the VR application (auto-control).
10) Storage and feedback: The examination results are stored in a cloud and locally on the terminal. Thus, a new application, which can be associated accordingly, can take place at any time. Furthermore, a display of a comparison of results between several measurement points in time is possible. The specific limit values and standard values serve as dynamic comparison variables in the illustrated application. In the event of a therapy-supporting function of the test, a possibility of feedback is incorporated. This means that determined data from the defined test environment, which were verified by a medical practitioner after completion of the test, are supplied to a standard database. The verification comprises further medical clarification of the patient's neurological health in the form of further diagnostics. The classification as "healthy" or "patient at risk" is performed by the medical practitioner and noted in the system afterwards.

In a further exemplary embodiment, designated in the following as "Variant 2," analogously to Variant 1, the motor reaction capability in a complex neurocognitive task is detected and motor and kinematic measurement data in the one-handed catching of a suddenly falling object is determined. The test is also almost completely software-based in this exemplary embodiment. The suddenly falling object appears in a virtual reality (VR) application, wherein the movement of the hand during the catching itself, as well as shortly before and thereafter, is quantified by sensors on the hand and/or on the arm of the test subject.

The measurement setup consists of a camera and VR goggles. The camera detects the position and movement of the hand in real space over the entire measurement process. The real image of the hand is integrated into the VR application, i.e., into the virtual space, and is presented to the user. Various parameters detected essentially by the camera are detected in the motor task. The movement of the hand in three-dimensional space and the acceleration behavior of the hand are thereby the focus of the observation.

The camera is a 360° camera, which is suitable for action recordings and has a Wi-Fi interface. Specifically, the model used is the Denver ACV-8305W 360-degree camera. The camera can be controlled with any WLAN-capable terminal.

As VR goggles, the Oculus Quest product is used. Oculus Quest are wireless VR goggles that can be used without a PC. They are suitable for use by eyeglass wearers, and the lenses can be adapted according to interpupillary distance. The latter is very relevant for use by a variety of different people.

The software is a VR application that can be accessed on any WLAN-capable terminal via a website. The program controls the VR application, and the examination program is started. The following is thereby simulated:
1) Optical assistance in assuming the starting position: For this purpose, an object in the form of a table is used, whereby the assumption of a standardized starting position of 90-100° at the elbow joint with respect to the arm posture is to be assumed by the user.
2) Monitoring of the starting position: Before the start of every single test, the starting position is monitored.
3) Simulation of a stationary object: In the upper part of the virtual image, a stationary object is visualized, i.e., in a kind of suspended position.
4) Output of an orientation signal (acoustic or subtly visual): A signal which should serve exclusively for the orientation of the user is output immediately before the beginning of a randomly selected time window. The signal indicates the beginning of the test, but it is expressly not linked to the actual sudden drop of the object. The visual attention of the user should be drawn to the object by the signal. The signal can be output acoustically by a beep tone or subtly visually, i.e., not by a light signal, but rather in that the visualized object wobbles somewhat, for example.
5) Simulation of a vertically falling object: Within the randomly selected time window of 6 seconds after the orientation signal, the virtual image of the object is simulated such that it suddenly falls vertically to the ground. The user perceives the sudden falling of the object only visually. This moment is not supported by an additional signal. Within the time window, the user has the task of catching the simulated object as quickly as possible. The kinematic parameters are detected by the camera, based upon sensors.
6) Simulation of the catching movement and braking of the falling movement of the object: The hand of the user and their movement are visualized in real time in the image. The corresponding movement of the object—in particular, the catching movement and the braking of the object—is simulated. The user thus receives an impression of the catching movement, which, optimally, strongly resembles reality.
7) Evaluation of the test results: The gathered parameters, whereby the movement is quantified, are thereupon collected, and stored in a cloud. Finally, an evaluation of the absolute measurement results takes place with consideration of a standard database of comparative measurements of healthy persons of different ages, and of age-specific limit values. The results are presented on the output page.
8) Input page: In order to be able to evaluate the test results in relation to the standard database, certain reference variables of the user are detected. These can be input in an input protocol (input page). The input can take place via two ways/modes:
a) Input takes place via the terminal (external control), or b) Input takes place via the VR application (auto-control).
9) Output page: The measured results from each repetition are detected and output at the terminal, and, in reduced form, in the user's field of vision. In addition, there are possibilities for controlling the application/test:
   a) The test is started and stored by the terminal (external control);
   b) The test can be started by the user itself and stored via the VR application (auto-control).
10) Storage and feedback: The examination results are stored in a cloud and locally at the terminal. Thus, a new application, which can be associated accordingly, can take place at any time. Furthermore, a display of a comparison of results between several measurement points in time is possible. The specific limit values and standard values serve as dynamic comparison variables in the presented application. In the event of a therapy-supporting function of the test, a possibility of feedback is incorporated. This means that determined data from the defined test environment, which were verified by a medical practitioner after completion of the test, are supplied to a standard database. The verification comprises further medical clarification of the patient's neurological health in the form of further diagnostics. The classification as "healthy" or "patient at risk" is performed by the medical practitioner and noted in the system afterwards.

A further exemplary embodiment is designated in the following as "Variant 3."

In a further exemplary embodiment, the application comprises a test for determining the reaction time processes, wherein the motor reaction capability is detected in a complex neurocognitive task. The test environment required for the test comprises a sensor system suitable for determining motor as well as kinematic measurement data. In this exemplary embodiment, this neurocognitive task is the one-handed catching of a suddenly falling object. The entire test is realized in a substantially software-based manner. The suddenly falling object thereby appears in a virtual reality (VR) application. The movement of the hand in the catching itself, and shortly before and thereafter, is quantified by acceleration sensors on the hand and/or on the arm of the user.

The measurement setup of Variant 3 consists of a camera, VR goggles, optionally a height-adjustable table, and a dummy as a measurement body.

The dummy is, for example, a vertically-oriented rod with a round cross-section (e.g., 3 cm) and a base which is placed on the height-adjustable table or on the floor (FIGS. 3 and 4). A sensor surface with pressure sensors, with which the hand strength is measured in the dynamic movement, is attached to the surface of the dummy.

The camera detects the position and movement of the hand in real space. The real image of the hand is integrated into the VR application, i.e., into the virtual space, and is presented to the user.

A camera tracking method is used in order to quantify the movement of the hand during the reaction task, and to detect the acceleration behavior before, during, and after the movement. Prominent anatomical points of the hand and of the arm are thereby detected with the camera, and the movement is detected and recorded. The anatomical structures are optionally marked beforehand by hand, or are captured directly by camera. The same can be realized with a bracelet that has the dimensions of a conventional wristwatch. Acceleration sensors are installed in the bracelet, by means of which the acceleration behavior can be detected in a time-synchronous manner before, during, and after the movement of the user in three-dimensional space.

By means of the camera in the VR goggles, the movements of the hand are detected, and the real image of the hand is integrated into the VR application, i.e., into the virtual space, and presented to the user. Various parameters are detected by the dummy during the motor task. The movement of the hand at the moment of grabbing, and the dynamic hand strength, are thereby the focus of the observation.

It is likewise conceivable to integrate EMG sensors, which either function wirelessly or are connected to the dummy via cables, in order to directly measure the muscle activity in the forearm during the reaction performance.

Instead of tracking the hand and the arm, it is also conceivable to use a bracelet that has the dimensions of a conventional wristwatch. The camera is a 360° camera which is suitable for action recordings and has a Wi-Fi interface. Specifically, the "Denver ACV-8305W 360°" model is used. This camera can be controlled with any WLAN-capable terminal.

As VR goggles, the Oculus Quest product is used. Oculus Quest are wireless VR goggles that can be used without a PC. They are suitable for use by eyeglass wearers, and the lenses can be adapted according to interpupillary distance. The latter is very relevant for use by/with a variety of different people.

Acceleration sensors and a Wi-Fi communications unit are likewise integrated into the wristband that is used. This enables wireless transmission of the gathered parameters to the evaluation unit during the movement measurement.

In one version, the dummies of a measurement body that are used are a vertically-aligned rod with a round cross-section, comparable to a kind of joystick. In another version, a longer rod with a round cross-section and a weighted, tilt-proof pedestal is used, comparable to a kind of slalom pole. The dummies have the following configurations:

"Joystick" model; see FIG. 3
   Length: 15 cm,
   Diameter in cross-section: 3 cm,
   Disinfectable, smooth surface,
   Equipped with pressure sensors,
   Used with a height-adjustable table.

"Slalom pole" model; see FIG. 4
   Length: 140 cm,
   Diameter in cross-section: 3 cm,
   Disinfectable, smooth surface,
   Equipped with pressure sensors,
   A tilt-proof, weighted pedestal that is placed directly on the floor.

The software is a VR application that can be accessed on any WLAN-capable terminal via a website. The program controls the VR application, and the examination program is started. The following is thereby simulated:
1) Optical assistance in assuming the starting position: For this purpose, an object in the form of a table is used, whereby the user is enabled to assume a standardized starting position of 90-100° at the elbow joint with respect to the arm posture. In addition, a height-adjustable table is used to which the joystick is attached. The table is visualized for the user in the virtual image for additional optical monitoring.
2) Monitoring of the starting position: If, as described in Point 1), a real table is used, the monitoring of the starting position is omitted.
3) Simulation of a stationary object: A stationary object, in a kind of suspended position on a platform, is visualized at the location at which the measurement body/dummy is also located.

4) Output of an orientation signal (acoustic or subtly visual): A signal which should serve exclusively for the orientation of the user is output immediately before the beginning of a randomly selected time window. The signal indicates the beginning of the test, but it is expressly not linked to the actual sudden drop of the object. The visual attention of the user should be drawn to the object by the signal. The signal can be output acoustically by a beep tone or subtly visually, i.e., not by a light signal, but rather in that the visualized object moves minimally, for example.

5) Simulation of a vertically falling object: Within the randomly selected time window of 6 seconds after the orientation signal, the virtual image of the object is simulated such that it suddenly falls vertically to the ground. The user perceives the sudden falling of the object only visually. This moment is not supported by an additional signal. Within the time window, the user has the task of catching the simulated object as quickly as possible without breaking the contact between arm and table. The reaction performance and the dynamic hand strength are detected by the sensors which are installed in the dummy/measurement body (e.g., pressure sensors), and are transmitted wirelessly.

6) Simulation of the catching movement and braking of the falling movement of the object: The hand of the user and its movement are visualized in real time in the image. The corresponding movement of the object—in particular, the catching movement and the braking of the object—is simulated. The user thus receives an impression of the catching movement, which, optimally, strongly resembles reality.

7) Evaluation of the test results: The gathered parameters, by which the movement is quantified, are collected, and stored in a cloud. Finally, an evaluation of the absolute measurement results takes place with consideration of a standard database of comparative measurements of healthy persons of different ages, and of age-specific limit values. The results are presented on the output page.

8) Input page: In order to be able to evaluate the test results in relation to the standard database, certain reference variables of the user are detected. These can be input in an input protocol (input page). The input can take place via two ways/modes:
a) Input takes place via the terminal (external control), or
b) Input takes place via the VR application (auto-control).

9) Output page: The measured results from each repetition are detected and output on the terminal, and, in reduced form, in the user's field of vision. In addition, there are possibilities for controlling the application/test:
a) The test is started and stored by the terminal (external control);
b) The test can be started by the user itself and stored via the VR application (auto-control).

10) Storage and feedback: The examination results are stored in a cloud and locally on the terminal. Thus, a new application, which can be associated accordingly, can take place at any time. Furthermore, a display of a comparison of results between several measurement points in time is possible. The specific limit values and standard values serve as dynamic comparison variables in the presented application. In the event of a therapy-supporting function of the test, a possibility of feedback is incorporated. This means that determined data from the defined test environment, which were verified by a medical practitioner after completion of the test, are supplied to a standard database. The verification comprises further medical clarification of the patient's neurological health in the form of further diagnostics. The classification as "healthy" or "patient at risk" is performed by the medical practitioner and noted in the system afterwards.

In a further exemplary embodiment of the invention, a complex reaction test is implemented in a virtual environment and with the inclusion of sensor systems. This exemplary embodiment is referred to in the following as "Variant 4." The measurement setup of Variant 4 consists of a camera, VR goggles, and EMG sensors. With this setup, different motor and kinematic measurement data are gathered in order to quantify the reaction performance of the user. The reaction test differs with respect to the first two exemplary embodiments in that the movement to be executed is not limited to the one-handed catching of a falling object. Furthermore, complex reaction tasks are to be realized in that the user reacts to different stimuli or signals with different motor actions.

As VR goggles, the Oculus Quest product is used. Oculus Quest are wireless VR goggles that can be used without a PC. They are suitable for use by eyeglass wearers, and the lenses can be adapted according to interpupillary distance. The latter is very relevant for use by a variety of different people.

The wired or wireless models of DataLITE from Biometrics Ltd. are used as surface EMG (electromyography) sensors. They are suitable for detecting the muscle activity of the superficial musculature, such as that of the forearm, which is activated during the movement of the fingers. The wireless sensors enable a muscle activity measurement at a range of up to 30 meters from the receiver. This is very advantageous for applications in determining movement sequences or time-reaction processes.

The complex reaction test is described in detail below: The user has the task of executing various motor actions with the hand or the upper extremity. Numerous parameters are thereby detected, such as the reaction time, the muscle activity, and the movement as well as the acceleration behavior of the hand and the arm in three-dimensional space. The motor test is realized in a substantially software-based manner. Various objects thereby appear in a virtual reality (VR) application.

The complex reaction test comprises the implementation of various reaction tasks. Different object shapes are thereby available for selection, each of which requires certain movements. The signals/stimuli vary according to the type of appearance of the object and the movement of the object. Certain motor action tasks which are to be executed as quickly as possible by the user result from the combination of object shape, object movement, or object appearance.

Object shapes: The virtual object varies in its shape between apple, rod, pencil, and basket and fly. Different movements of the hand are required, corresponding to these shape differences:

The apple (FIG. 5b) is gripped/grasped in the hand with angled forearm (90-100° at the elbow joint) and the supination position. The apple is caught one-handed.

The basket (FIG. 5e) is gripped/grasped in the hand in the pronation position. The basket is caught one-handed.

The rod (FIG. 5a) is gripped/grasped in the hand in the neutral position. The rod is caught one-handed, simultaneously with two hands, or two-handed. At the beginning of the movement, the hands are open, and a complete first closure is performed.

The pencil (FIG. 5d) is gripped/grasped in the hand in the neutral position. The pencil is caught one-handed. At the beginning of the movement, the hands are open, and the pencil is caught between thumb and index finger in the pincer grip.

The fly (FIGS. 5c and 5f) is caught between the palms. At the beginning of the movement, the hands are open in the neutral position, the arms are stretched in front of the body, and the palms are aligned with one another. The fly is caught by rapidly striking the palms against one another.

Object movement and appearance: The manner of the appearance of the objects ranges from sudden appearance to fading, vibrating, and rotating. Furthermore, the objects can be moved in different ways in three dimensions (from bottom to top, from top to bottom, from right to left, from left to right). The different signals/stimuli to which the user must later react with the appropriate motor action result from these movements and appearances of the object.

Reaction tasks: The reaction tasks to be performed thereby comprise:
- catching the suddenly moving object with one hand or simultaneously with both hands
- evading the moving object with one hand or with both hands
- bringing both palms together around a moving object (clapping it in the hands)
- contacting a target surface with the opened and extended hand one-handed, alternately with the right and left hands, or simultaneously with both hands.

The posed tasks of the movement patterns mentioned here can also appear in combination. The reaction tasks can be executed with and without object movement.

An exemplary sequence of the complex reaction test is described in the following.

| Task 1: | |
|---|---|
| Object shape | Apple (as in FIG. 5b), which hangs from the ceiling and suddenly falls down |
| Required movement | Catching in supination with the dominant hand, or evading and retracting the hand |
| Object movement | (A) apple suddenly falls down without additional signal or (B) vibrates before falling |
| Reaction task | for (A), catching apple with the dominant hand for (B), dodging apple |

| Task 2: | |
|---|---|
| Object shape | Pencil (as in FIG. 5d) or rod (as in FIG. 5a) |
| Required movement | Catching with pincer grip with one hand, or catching in the classic fist closure with one hand |
| Object movement | (A) pencil moves from the right in the direction of the midline of the user, or (B) pencil moves from the left in the direction of the midline of the user, or (C) rod moves from the right in the direction of the midline of the user, or (D) rod moves from the left in the direction of the midline of the user, or |
| Reaction task | for (A), catching pencil with the left hand in a pincer grip for (B), catching pencil with the right hand in a pincer grip for (C), catching rod with the left hand in the classical grip with fist closure for (D), catching rod with the right hand in the classical grip with fist closure |

| Task 3: | |
|---|---|
| Object shape | Fly (as in FIG. 5c and FIG. 5f) |
| Required movement | Move the palms of both hands together/clap it in the hands; touch a target surface with open palms |
| Object movement | (A) Fly moves through the room and comes towards the user, or (B) Fly no longer moves, or (C) Two flies emerge simultaneously (fading) in the image |
| Reaction task | for (A), move palms of both hands together and catch it between them for (B), touch the fly with open palm for (C), touch both flies simultaneously with a respective hand |

| Task 4: | |
|---|---|
| Object shape | Fly (as in FIG. 5f) |
| Required movement | Touching a target surface with open palms |
| Object movement | Two flies are shown without movement |
| Reaction task | With one hand, the user will alternately touch both flies as many times as possible and as quickly as possible within 30 seconds. |

CITED NON-PATENT LITERATURE

LaStayo, P., & Hartzel, J. (1999). Dynamic versus static grip strength: how grip strength changes when the wrist is moved, and why dynamic grip strength may be a more functional measurement. Journal of Hand Therapy, 12(3), 212-218.

Chang, H., Chen, C. H., Huang, T. S., & Tai, C. Y. (2015). Development of an integrated digital hand grip dynamometer and norm of hand grip strength. Bio-Medical Materials and Engineering, 26, pp. 611-617. https://doi.org/10.3233/BM E-151352

REFERENCE SIGNS

1 Camera
2 VR goggles
3 Gloves and bracelet equipped with sensors
4 Assistance for the user in assuming the starting position, as a virtual image
5 Capture apparatus, as a virtual image
6 Suspension of the measurement objects, as a virtual image
7 Virtual image of the measurement body in the form of a rod with a round cross-section
8 Virtual image of the measurement body in the form of a sphere
9 Joystick/measurement body in the form of a rod with a round cross-section, as a real embodiment
10 Assistance for the user in assuming the starting position, as a real embodiment
11 Tracking points for movement measurement in three-dimensional space 12 Bracelet for movement measurement in three-dimensional space
13 Slalom pole/measurement body in the form of a rod with a round cross-section, as a real embodiment
14 Electromyography (EMG) sensors
15 Virtual image of object in the form of an apple
16 Virtual image of object in the form of a fly
17 Virtual image of object in the form of a pencil
18 Virtual image object in the form of a basket

The invention claimed is:

1. A computer-implemented method for determining reaction time processes of at least one user by means of at least one sensor system, having the following steps:
   i. presenting at least one virtual object in a virtual space,
   ii. displaying a directed movement of the virtual object in a space, wherein the movement proceeds along an axis which corresponds to the x-, y-, or z-axis of a Cartesian coordinate system, in relation to the user,
   iii. determining or calculating the real reaction time process of the directed movement of the virtual object,
   iv. detecting the user in real space,
   v. detecting the movement or movement sequences of the user in real space,
   vi. determining or calculating the real reaction time process of the directed movement of the user,
   vii. correlating the virtual and real movement sequences of steps iv and vi, and
   viii. determining the reaction time processes using the movement sequences from steps iv and vi,
   wherein the at least one sensor system is arranged in or on a real measuring device and is capable of detecting movement data via the detection of contact of the real measuring device by the user:
   wherein the real measuring device is modeled, in terms of its shape, upon the virtual object in its presented shape,
   wherein the real measuring device is a joystick,
   wherein the computer-implemented method further comprises providing optical assistance for the user when in assuming a starting position, whereby an object in the form of a real table is used, and wherein the user is enabled to assume a standardized starting position of 90-100° at the elbow joint with respect to arm posture, wherein the joystick is attached to the table, and the real table is visualized as the real table for the user in a virtual image for additional optical monitoring, and
   wherein presenting the at least one virtual object in the virtual space comprises visualizing the joystick in the virtual image such that the joystick is visualized at the location at which the joystick is actually located attached to the table.

2. The computer-implemented method according to claim 1, characterized in that at least one starting point and at least one collision point of at least one virtual object and the user is determined from the reaction time process of the directional movement of the virtual object and the reaction time process of the movement of said at least one user.

3. The computer-implemented method according to claim 2, characterized in that the response time of the user is determined from the determined collision point.

4. The computer-implemented method according to claim 3, characterized in that the at least one sensor system is further designed for contactless detection of measurement data.

5. The computer-implemented method according to claim 4, characterized in that the at least one sensor system comprises an optical sensor system suitable for detection of movement processes.

6. The computer-implemented method according to claim 2, characterized in that the at least one sensor system is further designed for contactless detection of measurement data.

7. The computer-implemented method according to claim 1, characterized in that the at least one sensor system is further designed for contactless detection of measurement data.

8. The computer-implemented method according to claim 1, characterized in that the at least one sensor system is further comprises an optical sensor system suitable for detection of movement processes.

9. An apparatus for determining reaction time processes of a real user in a virtual environment according to a method according to claim 1, comprising:
   at least one data processing unit,
   the at least one sensor system,
   at least one display element that is suitable for presenting the virtual objects in the virtual space via the virtual image,
   at least one output device that is suitable for outputting or relaying the determined sensory information,
   at least one interface to a database suitable for storing and comparing the determined sensory data, and at least one sensor system.

10. The apparatus according to claim 9, wherein the at least one sensor system comprises an optical sensor system and/or an acceleration sensor.

11. The apparatus according to claim 9, characterized in that the sensor system comprises sensors for determining position in three-dimensional space.

12. The apparatus according to claim 1, characterized in that the joystick is oriented vertically.

13. The apparatus according to claim 1, characterized in that the sensors are integrated into a planar structure, and the planar structure is designed so that it can subsequently be arranged detachably on the joystick.

14. The apparatus according to claim 1, characterized in that the sensor system comprises sensors for determining position in three-dimensional space.

15. The apparatus according to claim 14, characterized in that:
   the sensors are integrated into a planar structure, and the planar structure is designed so that it can subsequently be arranged detachably on the joystick.

16. The computer-implemented method according to claim 1, wherein the joystick is oriented vertically.

* * * * *